(No Model.)　　　　　　　　　　　J. ZEIS.　　　　　　　2 Sheets—Sheet 2.
CAR FENDER.
No. 539,564.　　　　　　　　　　　　　　　Patented May 21, 1895.
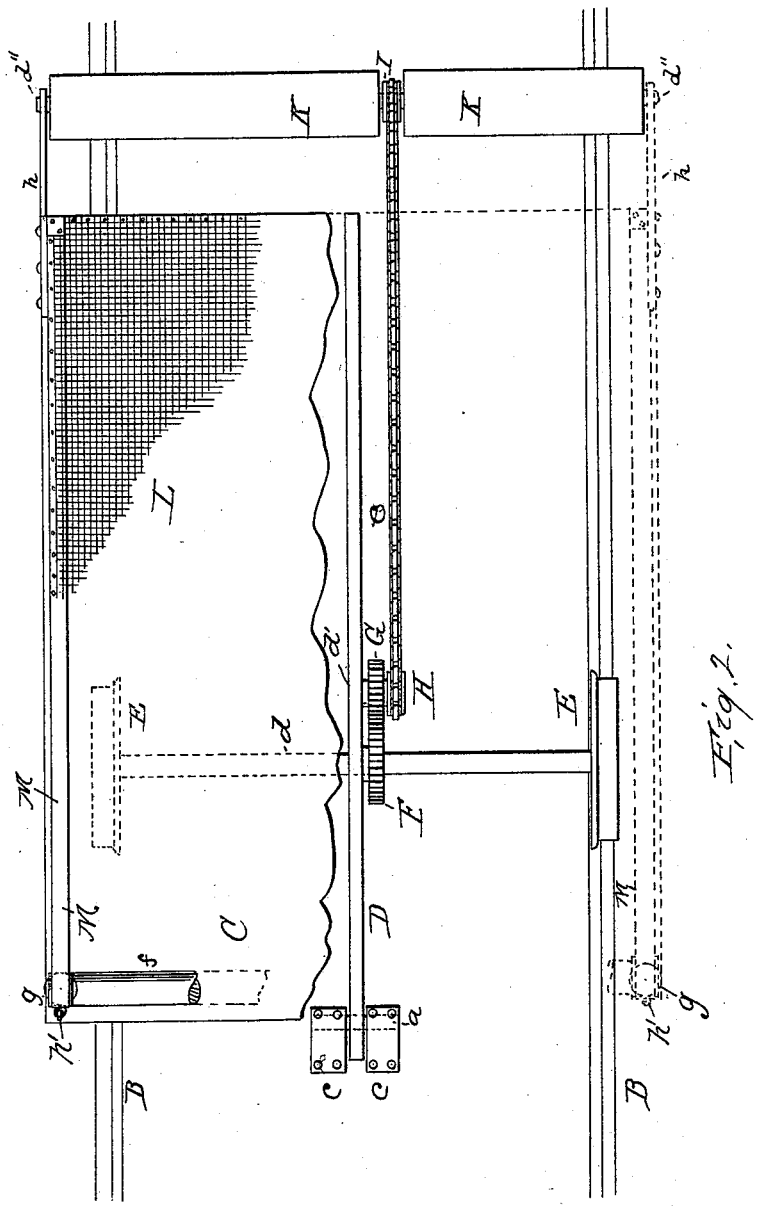
WITNESSES:　　　　　　　　　　　　　　　　　　　INVENTOR
　　　　　　　　　　　　　　　　　　　　　　　Joseph Zeis
　　　　　　　　　　　　　　　　　　　BY
　　　　　　　　　　　　　　　　　　　　　　　　ATTORNEY

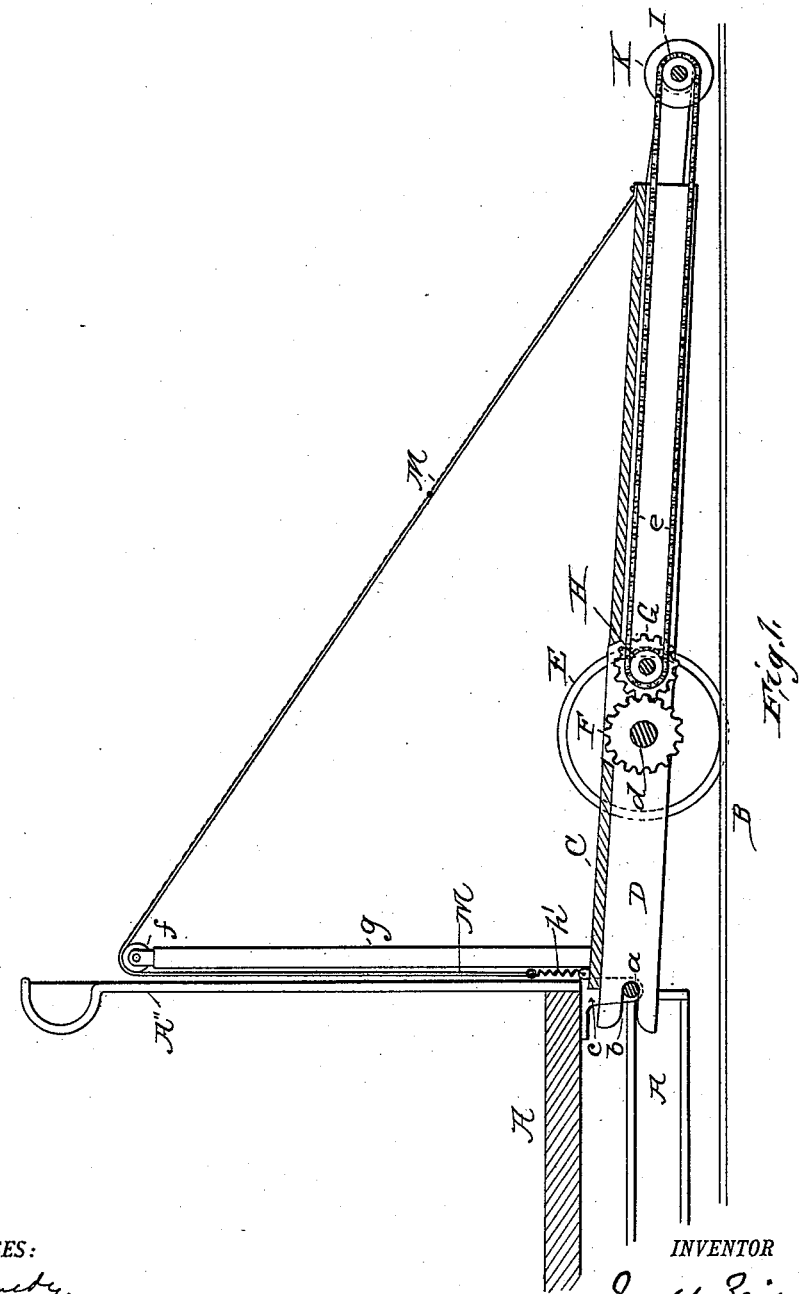

UNITED STATES PATENT OFFICE.

JOSEPH ZEIS, OF TRENTON, NEW JERSEY.

CAR-FENDER.

SPECIFICATION forming part of Letters Patent No. 539,564, dated May 21, 1895.

Application filed April 17, 1894. Serial No. 507,837. (No model.)

*To all whom it may concern:*

Be it known that I, JOSEPH ZEIS, a citizen of the United States, residing in the city of Trenton, county of Mercer, and State of New Jersey, have invented a new and useful Improvement in Car-Fenders, of which the following is a specification.

The object of my invention is to provide a car fender, which shall project in front of a street car or similar vehicle, whether the same be operated by means of a cable, trolley-wire, electricity, steam or other motive power, so applied that the front of the car is in danger of coming against other vehicles, persons or objects which may be upon the track.

My invention consists primarily of a netting which is preferably wider than the track on which the car runs and which is so placed, adjusted and operated, that any person or animal who may be struck by the fender shall be caught up and landed inside the net without injury.

One application of my invention is shown in the accompanying drawings, in which—

Figure 1 is a side view, partly in section, of the devices upon which the netting is mounted, the netting not being shown for the sake of clearness. Fig. 2 is a top view with the netting and plate partly broken away to show the structure below.

Same letters indicate similar parts in both figures.

A, A' and A² indicate portions of the car-platform to which my improved fender is removably attached in such manner that it may be detached and applied to the other end of the car if desired.

B—B indicate the rails of the track on which the car runs.

C is a bed-plate which projects forward a sufficient distance to furnish sufficient support to any person or object that may be picked up by the car-fender as hereinafter explained. This plate is designed also as a safe guard in case the netting hereinafter described should give way and is supported and stiffened by one or more bars D the inner end of which is forked as shown at $b$ to bear against the pin $a$ which is held in the brackets $c$ projecting from the car-platform.

E—E are the supporting wheels of the fender, mounted upon the axle $d$ journaled in the bar or bars D which also carry a gear wheel F which meshes with the gear G, supported on the bar D by the shaft $d'$. This shaft also carries the sprocket wheel H over which passes the chain $e$. At the other end of the chain is the sprocket wheel I mounted upon the shaft $d''$ which is turned thereby and carries the rollers K—K, which do not come in contact with the track but which are made to revolve by means of said chain in an opposite direction from the wheels E—E which rest upon the car track. It will thus be seen that the revolution of the rollers K—K, tends to repel or brush out from under the fender any object which may be lying upon the track and should the object be high enough, to sweep it up into the netting L, which not only extends over the whole upper surface of the plate C, at an angle therefrom being held up by the belts M but also extends down the sides and to a certain extent over the back of the fender.

The shaft $d''$ is journaled in extensions or brackets $h$ from the bed-plate C.

The belts M which support the netting L, are firmly secured to the forward end of the plate C and pass up over the roller $f$ which extends across the car front, being mounted on the stanchions $g$ and thence down behind said stanchions where they are secured to the bed-plate by the springs $h'$. This is to allow the belts and consequently the upper part of the netting to sag when any heavy object comes against it and without any tendency to throw the object off again the springs $h'$ being sufficiently yielding, to overcome the momentum of said object. If desired, a further yielding of the sides of the netting may be secured by making the stanchions cylindrical, turning upon a central pivot when strain is brought upon them as would be the case should an object come against the netting from the side.

The uses and advantages of my improved car fender will be readily understood the operation being such that the rollers K—K are kept in constant motion whenever the car itself is in motion, thereby tending to sweep back upon the yielding netting, any object which is tall enough to fall back upon the upper edge of the rollers, when struck by them.

I claim—

A car fender, which consists of a bed plate projecting forward from the front platform of the car and provided with one or more stiffening bars forked at the inner end, brackets projecting from the car platform and provided with a removable pin, against which said forked stiffening bar bears, a netting secured to the forward end of said plate and stretching over the upper surface thereof to and over a roller, which extends across the car front, a yielding attachment of the rear end of said netting to the bed plate behind the roller, whereby said netting is enabled to sag, when required, a roller extending across the front of the fender in advance of said netting and journaled in extensions of the bed plate, a pair of wheels resting upon the car track and serving to support said fender, so that the forward roller does not touch the ground, an axle journaled in the stiffening bar or bars, upon which said pair of wheels is mounted, a gear wheel mounted upon said axle and turning therewith, a sprocket wheel mounted upon an independent axle journaled in the stiffening bar and means for communicating motion to said sprocket wheel from said gear and lastly, a sprocket wheel and chain mechanism connecting said first mentioned wheel with the forward roller and adapted to communicate motion to said roller independently of the motion of the car wheel and in a direction the reverse of that of the fender wheel, whereby said forward roller tends to sweep up into the netting objects coming against said roller, substantially as described and shown.

JOSEPH ZEIS.

Witnesses:
  E. W. TAYLOR,
  D. H. FREAS.